United States Patent
Wu et al.

(10) Patent No.: US 7,750,495 B2
(45) Date of Patent: Jul. 6, 2010

(54) POWER LINE ADAPTER AND METHOD OF CONTROLLING POWER LINE ADAPTER OPERATED IN POWER-SAVING MODE

(75) Inventors: Hsiu-Wu Wu, Hsinchu (TW); Chung-Yi Chiu, Hsinchu (TW)

(73) Assignee: Alpha Networks Inc., Hsinchu (TW)

( * ) Notice: Subject to any disclaimer, the term of this patent is extended or adjusted under 35 U.S.C. 154(b) by 307 days.

(21) Appl. No.: 12/112,134

(22) Filed: Apr. 30, 2008

(65) Prior Publication Data

US 2009/0096592 A1 Apr. 16, 2009

(30) Foreign Application Priority Data

Oct. 12, 2007 (TW) ................. 96138295 A

(51) Int. Cl.
*H04B 3/54* (2006.01)
*H04M 9/00* (2006.01)
(52) U.S. Cl. .......................... 307/1; 455/402
(58) Field of Classification Search ............... 307/1; 455/402; 370/395.53; 439/638; 340/310.11
See application file for complete search history.

(56) References Cited

U.S. PATENT DOCUMENTS

| | | | |
|---|---|---|---|
| 6,483,902 B1 * | 11/2002 | Stewart et al. | 379/90.01 |
| 7,040,727 B2 | 5/2006 | Ryu et al. | |
| 7,626,489 B2 * | 12/2009 | Berkman et al. | 340/310.11 |
| 7,653,015 B2 * | 1/2010 | Binder | 370/293 |
| 7,686,653 B2 * | 3/2010 | Binder | 439/638 |
| 2007/0293953 A1 | 12/2007 | Hoshi | |

FOREIGN PATENT DOCUMENTS

| | | |
|---|---|---|
| CN | 1937434 A | 8/2009 |
| EP | 1667339 | 6/2006 |
| JP | 2005072970 A | 3/2005 |
| KR | 1020070069241 A | 7/2007 |
| KR | 102008005626 A | 6/2008 |

\* cited by examiner

*Primary Examiner*—Albert W Paladini
(74) *Attorney, Agent, or Firm*—WPAT, PC; Justin King

(57) ABSTRACT

A power line adapter and its controlling method to be operated in a power-saving mode are disclosed. The power line adapter includes a power-transmitting module for generating a DC supply voltage and a data-transmitting module for transmitting data. Furthermore, the data-transmitting module at least includes a power line communication circuit and an Ethernet physical layer transceiver. The controlling method comprises steps of: monitoring a link signal generated by the Ethernet physical layer transceiver when the power line adapter is operated in an active mode; and, disconnecting the DC supply voltage to the power line communication circuit and entering the power-saving mode if the link signal indicates a disconnection over a first time period.

13 Claims, 4 Drawing Sheets

| Power Consumption (W) | 120V AC/ 60Hz | 240V AC/ 50Hz |
|---|---|---|
| Active Mode | 3.20 | 4.00 |
| Power-Saving Mode | 0.6 | 1.15 |
| Save Power(%) | 80.83 | 71.25 |

FIG.4

POWER LINE ADAPTER AND METHOD OF CONTROLLING POWER LINE ADAPTER OPERATED IN POWER-SAVING MODE

FIELD OF THE INVENTION

The present invention relates to a power line adapter, and more particularly to a power line adapter can be operated in a power-saving mode.

BACKGROUND OF THE INVENTION

In the recent years, the personal computers (PC) and the networks have played essential roles in people's life, and now, we rely on computer networks to retrieve and share information. Today, individual computers can be connected to a power-line network, wherein the power-line network is constructed based on the electrical wires. Unfortunately, the magnitude of voltage in the electrical wires is much higher than the magnitude of voltage in signal itself; furthermore, the magnitude of noise in the electrical wires is also relatively high. However, the above problems can be solved by using the power-line adapter.

FIG. 1 is a diagram showing a power-line network, which is constructed by the electrical wires and power sockets in a house. Generally, there are a lot of power sockets in each division of a house, and these power sockets are connected in parallel by electrical wires. Today, these power sockets and electrical wires not only serve to supply the AC voltage (for example 120V 60 Hz), these power sockets and electrical wires can also be the components of the power-line network in the house. As depicted in FIG. 1, the AC voltage is supplied to the desktop computer 100 when the power plug 105 of the desktop computer 100 is plugged in the first power socket 110. Furthermore, the desktop computer 100 can be connected to the laptop computer 200 by using the electrical wires in the house if the network cable 115 of the desktop computer 100 is plugged in the first power line adapter 120 which is plugged in the second power socket 125, and also the network cable 215 of the laptop computer 200 is plugged in the second power line adapter 220 which is plugged in the third power socket 225.

FIG. 2 is a block diagram showing the circuit configuration of a conventional power line adapter. The power line adapter 300 comprises a power plug 302, a power line communication circuit 304, an Ethernet physical layer transceiver 316, a network socket 318, a bridge rectifier 320, a power transformer 322, and a DC/DC converter 324. The power line communication circuit 304 further comprises a coupling unit 306, a line driver 308, an analog front-end circuit 310, and a main controller 312.

In the conventional power line adapter 300, the power plug 302, the power line communication circuit 304, the Ethernet physical layer transceiver 316, and the network socket 318 together function as a data-transmitting module; the power plug 302, the bridge rectifier 320, the power transformer 322, and the DC/DC converter 324 together function as a power-transmitting module which is for providing the DC supply voltage (Vcc) needed by the operations of the power line communication circuit 304 and the Ethernet physical layer transceiver 316. That is, the AC voltage received by the power plug 302 is first converted to a first DC voltage by the bridge rectifier 320; the voltage level of the first DC voltage is further modulated by the power transformer 322; the modulated first DC voltage is further converted to the DC supply voltage (Vcc) by the DC/DC converter 324 and finally outputted to the power line communication circuit 304 and the Ethernet physical layer transceiver 316.

The network socket 318 is for the connection of the network cable (i.e., RJ45, not shown in FIG. 2) of a computer, and data can be derived to or derived from the computer through the Ethernet physical layer transceiver 316. In other words, when the computer is sending data out, the data outputted by the Ethernet physical layer transceiver 316 has to be processed and modulated by the main controller 312, the analog front-end circuit 310, the line driver 308, and the coupling unit 306, and then eventually transmitted to the electrical wires. Alternatively, when the computer is receiving data, the modulated data in the electrical wires is processed and demodulated by the coupling unit 306, the analog front-end circuit 310, and then eventually transmitted to the computer through the Ethernet physical layer transceiver 316.

Generally, the power line adapter is always plugged in the power socket, and accordingly the power is always consuming all the time even no cable connection is built or no data is transmitting between two computers. That is, 80%~90% power, compared to the power consumed by the power line adapter operating in transmitting data, is waste. Therefore, designing a power line adapter capable of operated in a power-saving mode when no cable connection is built or no data is transmitting is the main purpose of the present invention.

SUMMARY OF THE INVENTION

The object of the present invention is to provide a power line adapter capable of operated in a power-saving mode when no data is transmitting.

The present invention provides a power line adapter, comprising: a power plug, which can be plugged in a power socket, for receiving an AC voltage; a power-transmitting module, connected to the power plug, for converting the AC voltage to a DC supply voltage; a data-transmitting module, connected to the power plug, for transmitting data to the power plug or receiving data from the power plug, wherein the data-transmitting module at least comprises a power line communication circuit and an Ethernet physical layer transceiver; a micro controller, connected to the Ethernet physical layer transceiver, for receiving a link signal and a package signal which are derived from the Ethernet physical layer transceiver, and generating a control signal in response to the link signal or the package signal; and, a switch circuit for receiving the control signal and the DC supply voltage; wherein the switch circuit connects the DC supply voltage to the power line communication circuit when the control signal makes the switch circuit in a close position, and the switch circuit does not connects the DC supply voltage to the power line communication circuit when the control signal makes the switch circuit in an open position.

The present invention provides a method of controlling a power line adapter to be operated in a power-saving mode, wherein the power line adapter includes a power-transmitting module for generating a DC supply voltage and a data-transmitting module for transmitting data, and the data-transmitting module at least includes a power line communication circuit and an Ethernet physical layer transceiver, the method comprising steps of: monitoring a link signal generated by the Ethernet physical layer transceiver when the power line adapter is operated in an active mode; and, disconnecting the DC supply voltage to the power line communication circuit and entering the power-saving mode if the link signal indicates a disconnection over a first time period.

The present invention provides a method of controlling a power line adapter to be operated in a power-saving mode, wherein the power line adapter includes a power-transmitting module for generating a DC supply voltage and a data transmitting-module for transmitting data, and the data-transmitting module at least includes a power line communication circuit and an Ethernet physical layer transceiver, the method comprises steps of: monitoring a link signal and a package signal generated by the Ethernet physical layer transceiver when the power line adapter is operated in an active mode; and disconnecting the DC supply voltage to the power line communication circuit and entering the power-saving mode if the link signal indicates a connection state and the package signal indicates no data being transmitting over a second time period.

The above contents of the present invention will become more readily apparent to those ordinarily skilled in the art after reviewing the following detailed description and accompanying drawings, in which:

BRIEF DESCRIPTION OF THE DRAWINGS

FIG. 4 is a table showing the power consumption of the power line adapter operated in both the active mode and the power-saving mode.

DETAILED DESCRIPTION OF THE PREFERRED EMBODIMENT

The main function of the power line adapter is to transmit the data between the electrical wires and the Ethernet, where the Ethernet mainly adopts the 100 Base-T, or the 10 Base-T protocol. The 100/10 Base-T protocol uses the peer-to-peer system for transmitting data, that is, one peer (i.e., desktop computer) is capable of realizing that the opposite peer (i.e., laptop computer) is connected or disconnected through a link signal (Link); furthermore, the data is transmitting between the two peers (desktop computer and laptop computer) or not can be also aware of according to a package signal (Rxdv). The above-mentioned characteristics in the peer-to-peer system are adopted for the implement of the power line adapter having a power-saving mode of the present invention.

Figure 1:
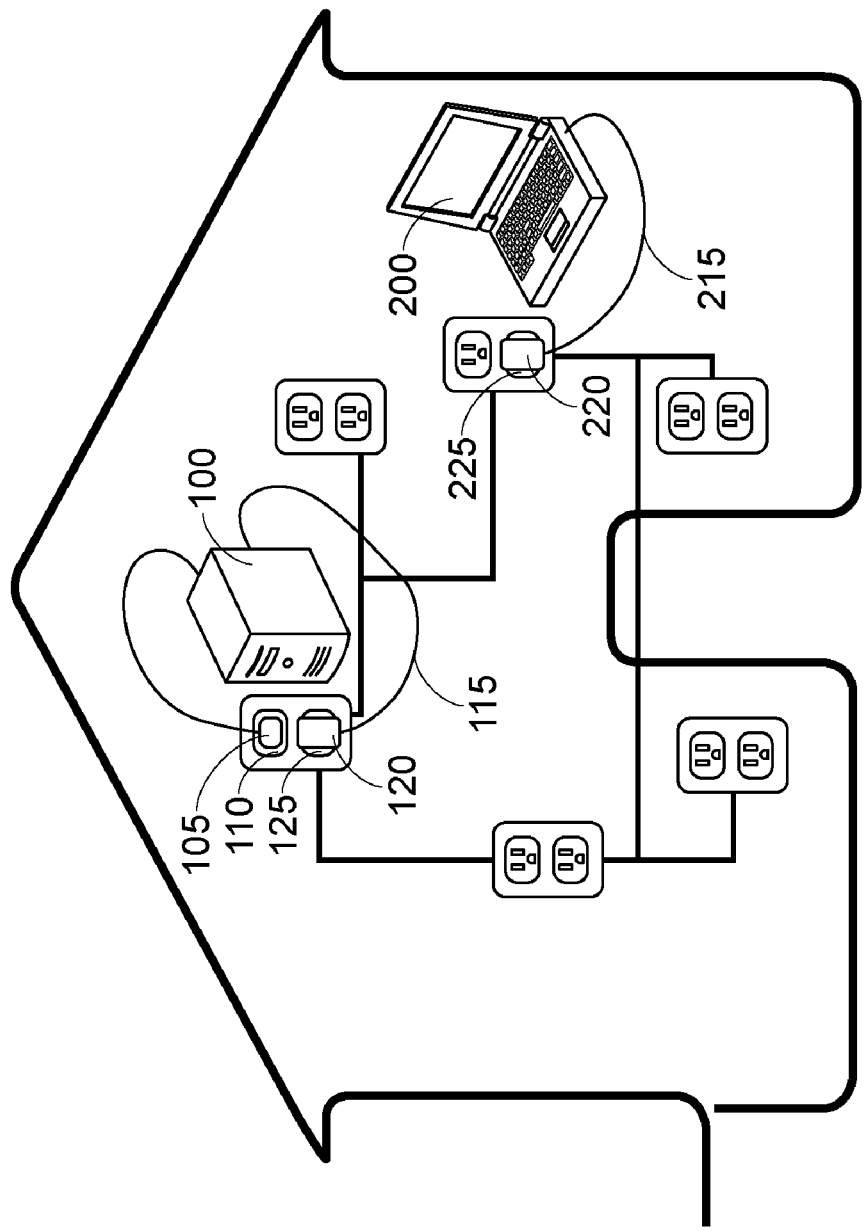
FIG. 1 is a diagram showing a power-line network.
Figure 2:
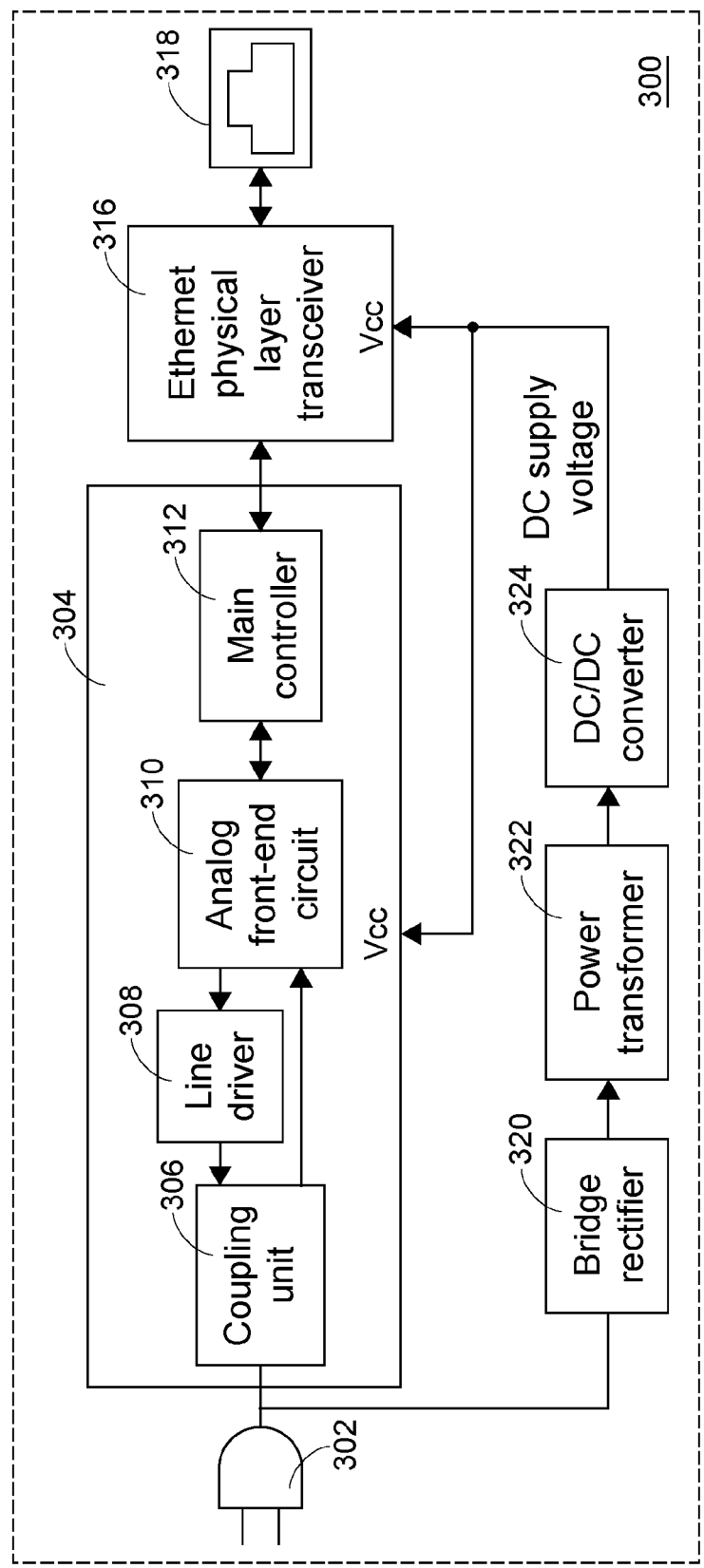
FIG. 2 is a block diagram showing the circuit configuration of a conventional power line adapter.
Figure 3:
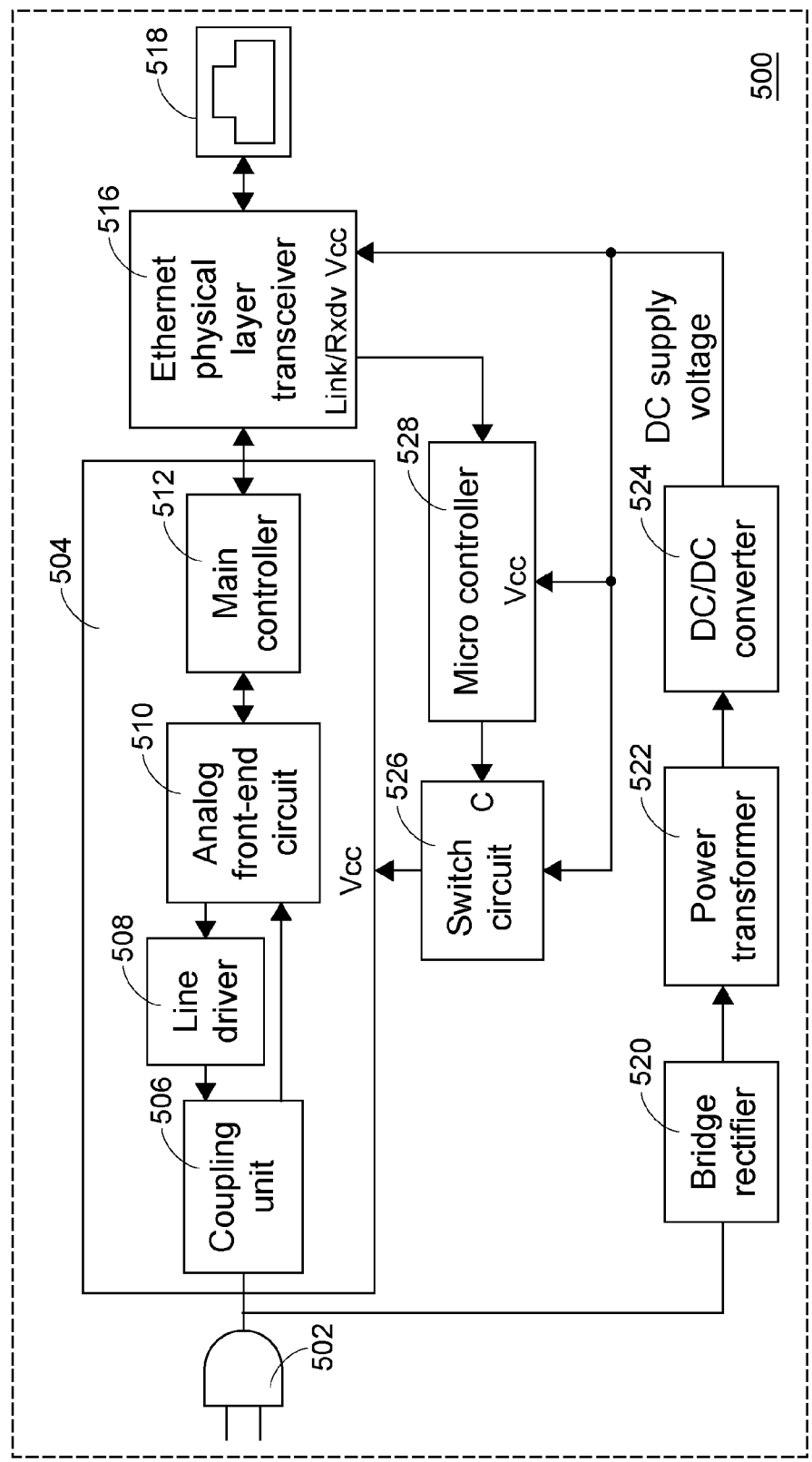
FIG. 3 is a block diagram showing the circuit configuration of a power line adapter of the present invention.

FIG. 3 is a block diagram showing the circuit configuration of a power line adapter of the present invention. The power line adapter 500 comprises: a power plug 502, a power line communication circuit 504, an Ethernet physical layer transceiver 516, a network socket 518, a bridge rectifier 520, a power transformer 522, a DC/DC converter 524, a switch circuit 526, and a micro controller 528. The power line communication circuit 504 further comprises: a coupling unit 506, a line driver 508, an analog front-end circuit 510, and a main controller 512.

In the power line adapter 500, the power plug 502, the power line communication circuit 504, the Ethernet physical layer transceiver 516, and the network socket 518 together function as a data-transmitting module; the power plug 502, the bridge rectifier 520, the power transformer 522, and the DC/DC converter 524 together function as a power-transmitting module which is to provide the DC supply voltage (Vcc) needed by the operation of the power line communication circuit 504, the Ethernet physical layer transceiver 516, and the micro controller 528. Additionally, the micro controller 528 and the switch circuit 526 together serve to provide a DC-controlled current path, and the switch circuit 526 can be implemented by a MOSFET.

In the embodiment of the present invention, the DC supply voltage (Vcc) is always supplied to the Ethernet physical layer transceiver 516 and the micro controller 528 no matter the power line adapter 500 is operated in the active mode or in the power-saving mode. The micro controller 528 serves to generate a control signal (C) to the switch circuit 526 in response to the link signal (Link) or the package signal (Rxdv) that are derived from the Ethernet physical layer transceiver 516. In other words, if the link signal (Link) indicates the connection is established and the package signal (Rxdv) indicates the data is transmitting, then the power line adapter 500 is assumed being operated in the active mode and the control signal (C) will make the switch circuit 526 in close position, accordingly the DC supply voltage (Vcc) is supplied to the coupling unit 506, the line driver 508, the analog front-end circuit 510, and the main controller 512 of the power line communication circuit 504. Alternatively, if the link signal (Link) indicates the connection is not established or the package signal (Rxdv) indicates the data is not transmitting, then the power line adapter 500 is assumed being operated in the power-saving mode and the control signal (C) will make the switch circuit 526 in open position, accordingly the DC supply voltage (Vcc) can not supply to the coupling unit 506, the line driver 508, the analog front-end circuit 510, and the main controller 512 of the power line communication circuit 504.

In the embodiment of the present invention, when the power line adapter 500 is operated in the active mode, the occurrence of the disconnection (or no link) can be detected by the micro controller 528 according to the link signal (Link). That is, the occurrence of the disconnection can be realized by the micro controller 528 if user pulls out cable from the network socket 518 or a computer network socket. If the disconnection has been occurred over a first time period (i.e., 10 seconds), the micro controller 528 makes the switch circuit 526 in open position through the control signal (C). Accordingly the DC supply voltage (Vcc) cannot provide to the power line communication circuit 504, and the power line adapter 500 enters the power-saving mode. When the micro controller 528 realizes the link (or connection) is rebuilt again through the link signal (Link), the micro controller 528 starts to make the switch circuit 526 in close position through the control signal (C). Accordingly the DC supply voltage (Vcc) is provided to the power line communication circuit 504, and the power line adapter 500 enters the active mode again.

In the embodiment of the present invention, the micro controller 528 starts to count time if the link signal (Link) indicates the link (or connection) is established but the package signal (Rxdv) indicates no data is transmitting when the power line adapter is operated in the active mode. If the power line adapter 500 is operated in the active mode but the status of no data transmitting has been occurred over a second time period (i.e., 10 minutes), the micro controller 528 then makes the switch circuit 526 in open position through the control signal (C). Accordingly the DC supply voltage (Vcc) cannot provide to the power line communication circuit 504, and the power line adapter 500 enters the power-saving mode. When the power line adapter 500 is operated in the power-saving mode but the micro controller 528 realizes the data is transmitting again through the package signal (Rxdv), the micro controller 528 then makes the switch circuit 526 in close position through the control signal (C). Accordingly the DC supply voltage (Vcc) is provided to the power line communication circuit 504, and the power line adapter 500 enters the active mode again.

FIG. 4 is a table showing the power consumption of the power line adapter operated in both the active mode and the power-saving mode. The power consumption is 3.2 Watt when the power line adapter 500 is powered by an AC voltage (120V, 60 Hz) and operated in the active mode. The power consumption is down to 0.6 Watt when the power line adapter 500 is operated in the power-saving mode. Therefore, 80.83% power will be saved when the power line adapter 500 is operated in the power-saving mode due to the disconnection or no data transmitting. Similarly, the power consumption is 4.0 Watt when the power line adapter 500 is powered by an AC voltage (240V, 50 Hz) and operated in the active mode. The power consumption is down to 1.15 Watt when the power line adapter 500 is operated in the power-saving mode. Therefore, 71.25% power will be saved when the power line adapter 500 is operated in the power-saving mode due to the disconnection or no data transmitting.

In the present invention, the switching between the active mode and the power-saving mode is achieved by detecting the link signal (Link) or the package signal (Rxdv) that are derived from the Ethernet physical layer transceiver 516. The power consumption is significantly reduced when the power line adapter of the present invention is operated in the power-saving mode.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A power line adapter, comprising:
    a power plug, which can be plugged in a power socket, for receiving an AC voltage;
    a power-transmitting module, connected to the power plug, for converting the AC voltage to a DC supply voltage;
    a data-transmitting module, connected to the power plug, for transmitting data to the power plug or receiving data from the power plug, wherein the data-transmitting module at least comprises a power line communication circuit and an Ethernet physical layer transceiver;
    a micro controller, connected to the Ethernet physical layer transceiver, for receiving a link signal and a package signal derived from the Ethernet physical layer transceiver, and generating a control signal in response to the link signal or the package signal; and
    a switch circuit for receiving the control signal and the DC supply voltage; wherein the switch circuit connects the DC supply voltage to the power line communication circuit if the control signal makes the switch circuit in a close position, and the switch circuit does not connects the DC supply voltage to the power line communication circuit if the control signal makes the switch circuit in an open position.

2. The power line adapter according to claim 1, wherein the power-transmitting module further comprises:
    a bridge rectifier, connected to the power plug, for the converting of AC voltage to a first DC voltage;
    a power transformer, connected to the bridge rectifier, for modulating the first DC voltage derived from the bridge rectifier; and
    a DC/DC converter, connected to the power transformer, for converting the modulated first DC voltage to the DC supply voltage needed by the data-transmitting module.

3. The power line adapter according to claim 1, wherein the data-transmitting module further comprises:
    the power line communication circuit connected to the power plug;
    the Ethernet physical layer transceiver connected to the power line communication circuit; and
    a network socket connected to the Ethernet physical layer transceiver;
    wherein a cable can be plugged into the network socket for receiving data from a computer or transmitting data to the computer.

4. The power line adapter according to claim 3, wherein the network socket is a RJ45 socket.

5. The power line adapter according to claim 3, wherein the Ethernet physical layer transceiver adopts a 100 Base-T or a 10 Base-T protocol.

6. The power line adapter according to claim 1, wherein the power line communication circuit further comprises:
    a coupling unit connected to the power plug;
    a line driver connected to the coupling unit;
    an analog front-end circuit connected to the coupling unit and the line driver; and
    a main controller connected to the analog front-end circuit and the Ethernet physical layer transceiver;
    wherein when data is transmitted from a computer to the power plug, the data is processed and modulated by the main controller, the analog front-end circuit, the line driver, and the coupling unit, and then transmitted to the power plug; when data is transmitted from the power plug to the computer, the modulated data is processed and demodulated by the coupling unit, the analog front-end circuit, and the main controller, and then transmitted to the computer through the Ethernet physical layer transceiver, a network socket and a cable.

7. A method of controlling a power line adapter to be operated in a power-saving mode, wherein the power line adapter includes a power-transmitting module for generating a DC supply voltage and a data-transmitting module for transmitting data, and the data-transmitting module at least includes a power line communication circuit and an Ethernet physical layer transceiver, the method comprising steps of:
    monitoring a link signal generated by the Ethernet physical layer transceiver when the power line adapter is operated in an active mode; and
    disconnecting the DC supply voltage to the power line communication circuit and entering the power-saving mode if the link signal indicates a disconnection over a first time period.

8. The method according to claim 7, wherein the first time period is 10 seconds.

9. The method according to claim 7, further comprises a step of:
    connecting the DC supply voltage to the power line communication circuit and entering the active mode if the link signal indicates a connection state is established when the adapter is operated in the power-saving mode.

10. The method according to claim 7, further comprises a step of:
    connecting the DC supply voltage to the power line communication circuit and entering the active mode if a package signal indicates data is transmitting when the power line adapter is operated in the power-saving mode.

11. A method of controlling a power line adapter to be operated in a power-saving mode, wherein the power line adapter includes a power-transmitting module for generating a DC supply voltage and a data transmitting-module for transmitting data, and the data-transmitting module at least includes a power line communication circuit and an Ethernet physical layer transceiver, the method comprises steps of:
  monitoring a link signal and a package signal generated by the Ethernet physical layer transceiver when the power line adapter is operated in an active mode; and
  disconnecting the DC supply voltage to the power line communication circuit and entering the power-saving mode if the link signal indicates a connection state and the package signal indicates no data being transmitting over a second time period.

12. The method according to claim 11, wherein the second time period is 10 minutes.

13. The method according to claim 11, further comprises a step of:
  connecting the DC supply voltage to the power line communication circuit and entering the active mode if a package signal indicates data being transmitting when the power line adapter is operated in the power-saving mode.

* * * * *